(12) United States Patent
Stromberg et al.

(10) Patent No.: US 12,487,106 B1
(45) Date of Patent: Dec. 2, 2025

(54) OBSERVER SYSTEMS AND METHODS

(71) Applicant: National Technology & Engineering Solutions of Sandia, LLC, Albuquerque, NM (US)

(72) Inventors: Peter G. Stromberg, Albuquerque, NM (US); Kevin H. Brown, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 631 days.

(21) Appl. No.: 17/885,337

(22) Filed: Aug. 10, 2022

(51) Int. Cl.
*G01D 11/30* (2006.01)
*G01D 5/26* (2006.01)

(52) U.S. Cl.
CPC ............. *G01D 11/30* (2013.01); *G01D 5/268* (2013.01)

(58) Field of Classification Search
None
See application file for complete search history.

(56) References Cited

U.S. PATENT DOCUMENTS

| | | | |
|---|---|---|---|
| 4,215,273 A | 7/1980 | Frosch et al. | |
| 4,746,798 A | 5/1988 | Amon et al. | |
| 5,528,418 A | 6/1996 | Bowman et al. | |
| 5,631,770 A | 5/1997 | Jarmuz | |
| 5,781,336 A | 7/1998 | Coon et al. | |
| 6,208,459 B1 | 3/2001 | Coon et al. | |
| 6,950,243 B2 | 9/2005 | Wiese et al. | |
| 7,148,974 B1 | 12/2006 | Schmitt et al. | |
| 8,605,349 B2* | 12/2013 | Maraviglia | G02B 27/644 |
| | | | 250/336.1 |
| 9,244,264 B1 | 1/2016 | Brown et al. | |
| 2003/0218686 A1 | 11/2003 | Lundgren | |
| 2004/0021852 A1 | 2/2004 | DeFlumere et al. | |
| 2005/0030237 A1 | 2/2005 | Wong et al. | |
| 2008/0018995 A1 | 1/2008 | Baun | |
| 2009/0015914 A1 | 1/2009 | Duncan et al. | |
| 2011/0228383 A1 | 9/2011 | Cook | |
| 2012/0170024 A1 | 7/2012 | Azzazy et al. | |
| 2013/0107360 A1 | 5/2013 | Kurtz et al. | |
| 2013/0193315 A1* | 8/2013 | Shemesh | G01J 1/04 |
| | | | 359/554 |
| 2013/0271766 A1 | 10/2013 | Richards | |
| 2015/0059567 A1* | 3/2015 | Fox | F41G 3/10 |
| | | | 89/41.19 |
| 2019/0260471 A1* | 8/2019 | Brown | H04B 10/11 |

* cited by examiner

*Primary Examiner* — Eric S. McCall
*Assistant Examiner* — Nigel H Plumb
(74) *Attorney, Agent, or Firm* — Calfee, Halter & Griswold LLP; Samantha Updegraff; Merle W. Richman

(57) ABSTRACT

An observer system includes a support frame, a first support member, a second support member, and an observer. The first support member is attached to the support frame such that the first support member is rotatable relative to the support frame about a first axis. The second support member is attached to the first support member and extends along a second axis, and an observer is attached to the second support member such that the observer is able to rotate about the second axis. The observer is rotatable relative to the support frame about both the first and second axes such that the observer can achieve a 4 pi steradian field of regard.

8 Claims, 14 Drawing Sheets

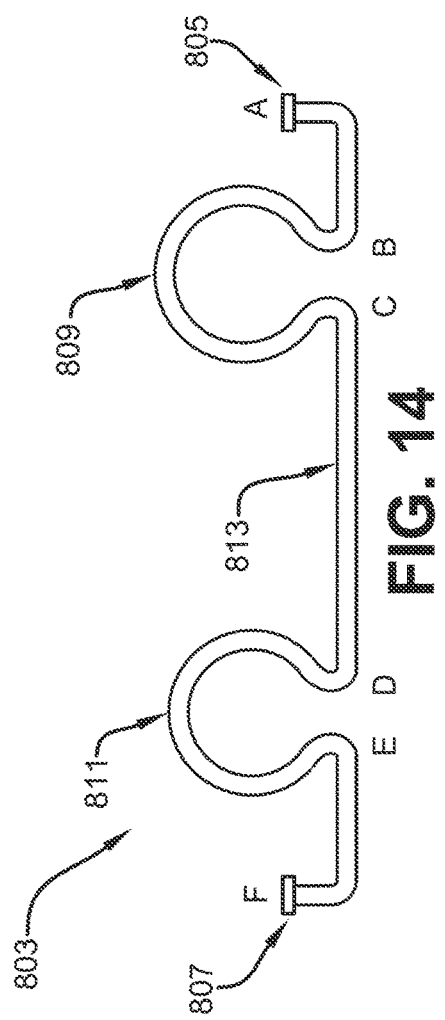
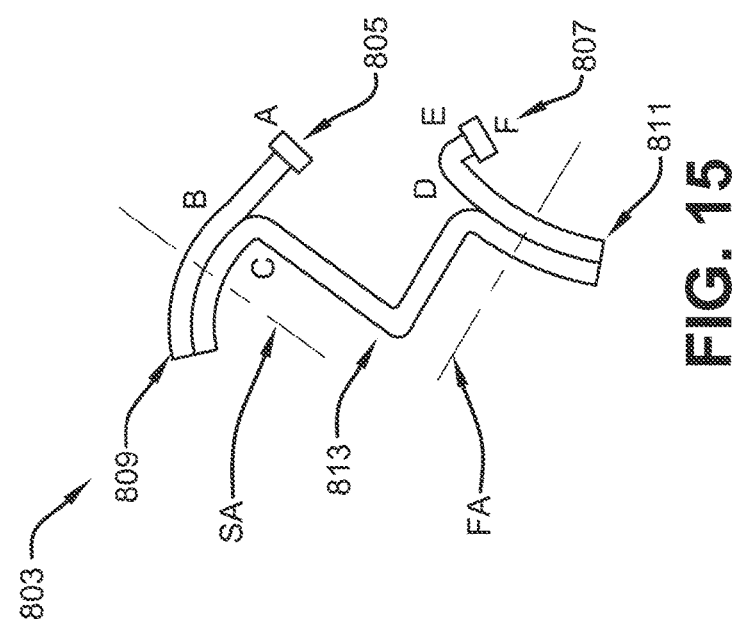

OBSERVER SYSTEMS AND METHODS

STATEMENT OF GOVERNMENT INTEREST

This invention was made with Government support under Contract No. DE-NA0003525 awarded by the United States Department of Energy/National Nuclear Security Administration. The U.S. Government has certain rights in the invention.

BACKGROUND

Gimbaled observer systems allow an observer to observe in various directions. Conventional gimbaled observer systems tend to be relatively expensive to design and build. These systems typically include a base that includes internal mechanics and electronics that cause rotation of one or more components to allow for movement of the observer in different directions. The various components of these systems (e.g., the base, the solar panels that must be oriented toward the sun, etc.) limit the movement of the observer and, consequently, the observation range of the observer. More specifically, conventional gimbal designs limit observation range due to the inability to rotate about multiple axes.

SUMMARY

An exemplary embodiment of an observer system includes a support frame, a first support member, a second support member, and an observer. The first support member is attached to a first face of the support frame such that the first support member is rotatable relative to the support frame about a first axis that is substantially perpendicular to the first face. The second support member is attached to the first support member and extends along a second axis, and an observer is attached to the second support member such that the observer is able to rotate about the second axis. The observer is rotatable relative to the support frame about both the first and second axes such that the observer can achieve a 4 pi steradian field of regard.

Another exemplary embodiment of an observer system includes a support frame, a first support member, a second support member, and an observer. The first support member is attached to the support frame and rotatable relative to the support frame about a first axis that is substantially parallel to a first face. The second support member is attached to the first support member and extends along a second axis, and the observer is attached to the second support member such that the observer is offset relative to the first face and able to rotate about the second axis. The observer is rotatable relative to the support frame about both the first and second axes such that the observer can achieve a 4 pi steradian field of regard.

Another exemplary embodiment of an observer system includes a support frame, a first support member, a second support member, an observer, and a rotary fiber optic cable. The first support member is attached to the support frame and rotatable relative to the support frame about a first axis. The second support member is attached to the first support member and extends along a second axis, and the observer is attached to the second support member such that the observer is able to rotate about the second axis. The rotary fiber optic cable is attached to the observer for transmitting data from the observer. The rotary fiber optic cable has a first rounded portion that is concentric with the first axis when in a folded configuration and a second rounded portion that is concentric with the second axis when in a folded configuration.

BRIEF DESCRIPTION OF THE DRAWINGS

FIG. 14 is an exemplary embodiment of a rotary fiber optic cable shown in a flat configuration;

FIG. 15 is an exemplary embodiment of the rotary fiber optic cable of FIG. 14 shown in a folded configuration.

DETAILED DESCRIPTION

Figure 1:
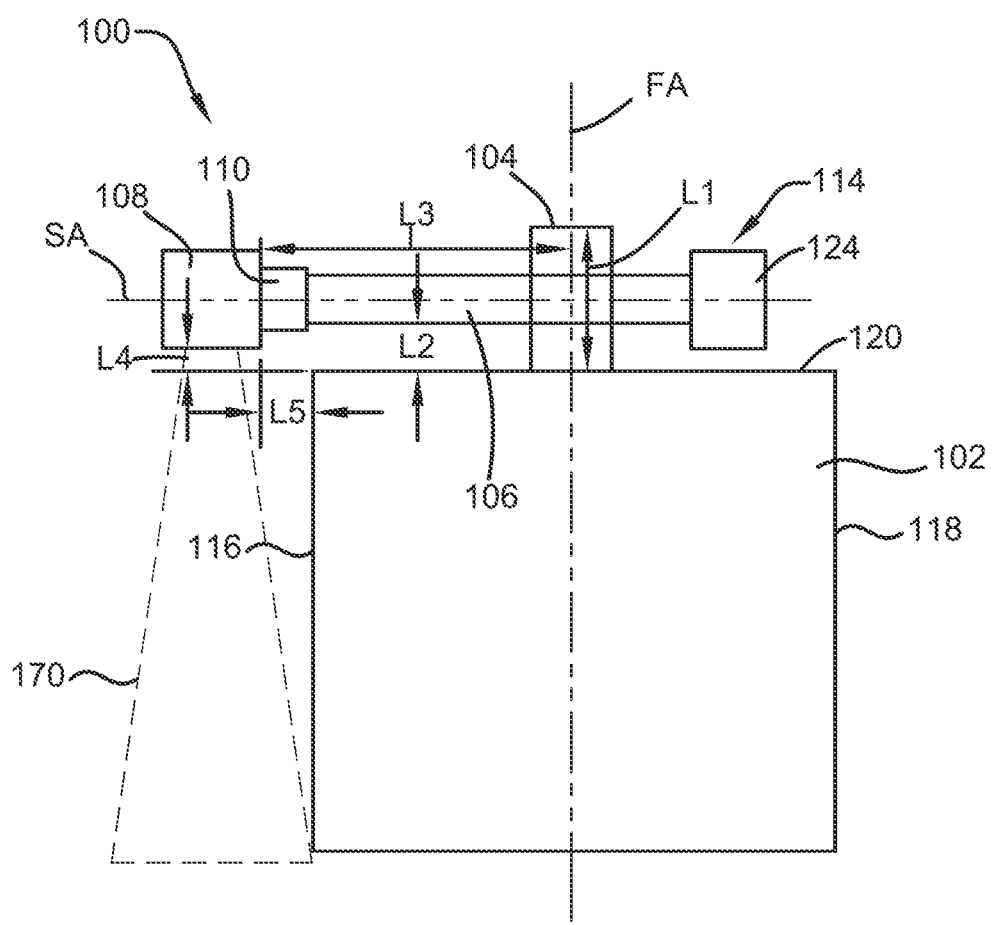
FIG. 1 is a schematic view of an exemplary embodiment of an observer system.

The Detailed Description describes exemplary embodiments of the invention and is not intended to limit the scope of the claims in any way. Indeed, the invention is broader than and unlimited by the exemplary embodiments, and the terms used in the claims have their full ordinary meaning. Features and components of one exemplary embodiment may be incorporated into the other exemplary embodiments. Inventions within the scope of this application may include additional features, or may have less features, than those shown in the exemplary embodiments.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

In addition, as described herein, when one or more components are described as being connected, joined, affixed, coupled, attached, or otherwise interconnected, such interconnection may be direct as between the components or may be indirect such as through the use of one or more intermediary components. Also, as described herein, reference to a "member," "component," or "portion" shall not be limited to a single structural member, component, or element but can include an assembly of components, members, or elements. Further, as described herein, the terms "substantially" and "about" are defined as at least close to (and includes) a given value or state (preferably within 10% of, more preferably within 1% of, and most preferably within 0.1% of).

The exemplary observer systems described herein can allow for a mounting or support frame to be unrestrained in terms of orientation while still allowing for an observer of the observer system to have 4 pi steradian access, which means the observer is capable of observing in all directions without the support frame obstructing the field of view of the observer. That is, the support frame can be in any arbitrary position, and the observer will still be capable of observing in all directions without the support frame obstructing the field of view of the observer. The 4 pi steradian access of the observer while the support frame is unrestrained in terms of orientation is advantageous because it allows the support frame to be pointed or positioned in any orientation depending on the particular application in which the observer system is being used. For example, satellites may require a support frame that is oriented to point in a specific direction, and the observer systems described herein allow the support frame to be pointed in any desired direction while still achieving 4 pi steradian access. In another example, camera or sensor systems can be attached to a building to provide security for the building, and the observer systems described herein can include a support frame that is capable of being attached to a building in several different orientations while still achieving 4 pi steradian access.

The observer systems described herein have an observer that is capable of rotating along two axes relative to a support frame, which allows the observer to observe in all directions. The observer systems also include support members that attach the observer to the support frame and allows the observer to rotate about the two axes without the support frame being able to contact the observer during such rotation in any manner that would prevent the observer from obtaining 4 pi steradian access. The observer systems can be used in a wide variety of applications. In some instances, the observer systems are attached to satellites such that the observer systems can be used to observe in space related applications.

Referring to FIG. 1, an exemplary embodiment of an observer system 100 includes a support frame 102, a first support member 104, a second support member 106, and an observer 108. The observer 108 can be, for example, a sensor, a camera, an antenna, or any other component that is capable of perceiving an observable attribute. In some embodiments, the observer 108 can take the form of a telescope, such as, for example, any telescope described in U.S. Pat. No. 9,244,264 ("the '264 Patent"), which is incorporated herein by reference in its entirety. The observer system 100 can also include any of the components (e.g., circuitry, electronics, mechanics, etc.) described in the '264 Patent that are used with the telescopes described therein.

The first support member 104 is attached to the support frame 102 and configured to rotate relative to the support frame 102. The first support member 104 can include mechanics internal thereto (not shown) that allow the first support member to rotate about a first axis FA. In the illustrated embodiment, the first axis FA is substantially perpendicular to a front face 120 of the support frame 102.

The second support member 106 is attached to the first support member 104 such that the second support member 106 rotates about the first axis FA as the first support member 104 rotates about the first axis FA. The second support member 106 can be fixedly attached to the first support member 104, or the second support member 106 can be rotatably attached to the first support member 104 such that the second support member 106 is able to rotate about a second axis SA, where the second axis SA extends along a length of the second support member 106 and, thus, the second axis SA moves as the second support member 106 moves as a result of rotation of the first support member 104. In embodiments in which the second support member 106 is rotatably attached to the first support member 104, the second support member 106 can include mechanics internal thereto (not shown) that allow the second support member to rotate about a second axis SA. In the illustrated embodiment, the second axis SA is substantially perpendicular to the first axis FA. The second axis SA, however, may take any other suitable position relative to the first axis FA, provided that the observer 108 is capable of moving relative to the support structure such that the observer 108 can obtain 4 pi steradian access. The first and second support members 104, 106 can be made of any suitable material, such as, for example, titanium, carbon fiber, any other suitable material, and any combination thereof.

In some embodiments, the observer system 100 includes a third support member 110 that is rotatably attached to the second support member 106 and fixed to the observer 108. In alternative embodiments, the observer 108 may be directly rotatably attached to the second support member 106, rather than having the third support member 110 positioned therebetween. In each of these embodiments, the second support member 106 may be fixedly attached to the first support member 104. The third support member 110 can be made of any suitable material, such as, for example, titanium, carbon fiber, any other suitable material, and any combination thereof.

In some embodiments, the first support member 104, the second support member 106, the third support member 110, and/or the observer 108 are able to rotate both clockwise and counterclockwise 180 degrees from an original position, which allows for 360 degrees of rotation. In alternative embodiments, the first support member 104, the second support member 106, the third support member 110, and/or the observer 108 are able to rotate 360 degrees in only a clockwise direction, 360 degrees in only a counterclockwise direction, or 360 degrees in both a clockwise and counterclockwise direction.

The observer system 100 is configured to allow the observer 108 to obtain 4 pi steradian access. That is, the observer 108 is capable of observing in all directions without the support frame 102 obstructing the field of view of the observer, regardless of the orientation of the support frame 102. In the illustrated embodiment, the observer 108 is configured to rotate about both the first axis FA (e.g., via the rotation of the of the first support member 104) and the second axis SA (e.g., via rotation of at least one of the second support member 106, the third support member 110, or the observer 108 itself). This movement of the observer 108 about both the first and second axes FA, SA allows the observer 108 to observe in all directions. In some embodiments, an end 114 of the second support member 106 that is opposite the observer 108 can include weight(s) 124 to mass-balance the observer system 100. For example, the weight(s) 124 can be configured to at least partially offset the mass of the observer 108. The balance caused by the weight(s) 124 can also allow for inertial stability to keep the observer 108 pointing toward a target when the support frame 102 moves relative to the target during observation. The end 114 of the second support member 106 can also include any other electronic components or other types of components that work with the observer 108, such as, for example, any of the electronic or other types of components described in the '264 Patent.

The first support member 104, the second support member 106, and the observer 108 are positioned relative to the support frame 102 such that none of these components contact the support frame to prevent the observer 108 from having 4 pi steradian access. That is, the dimensions of the first support member 104, the second support member 106, and the observer 108, as well as the offset of these components relative to the support frame 102, allow for the observer 108 to move freely to observe in all directions. The dimensions can be scalable to accommodate a wide variety of sizes for the observer system 100. In some embodiments, the first support member 104 can have a length L1 of between about 7 inches and about 10 inches. The second support member 106 can be offset from a front face 120 of the support frame 102 (e.g., the face that the first support member 104 extends from) by a length L2 that is between about 2 inches and about 6 inches, which allows clearance for the observer 108 and the weights 124 to swing relative to the front face 120. The observer 108 can extend from a centerline of the first support member 104 (or the first axis FA) by a length L3 that is between about 10 inches and about 12 inches. The observer 108 can be offset from a front face 120 of the support frame 102 (e.g., the face that the first support member 104 extends from) in a direction parallel to the first support member 104 by a length L4 that is between about 1 inch and about 3 inches. In other embodiments, the observer 108 can extend past the front face 120 of the support frame 102 such that at least a portion of the observer 108 can be positioned proximate one or more side edges 116, 118 of the support frame 102.

The observer 108 can be offset from a side edge 116 of the support frame 102 in a direction parallel to the second support member 106 by a length L5 such that a field of view 170 of the observer 108 is not obstructed by the support frame 102. The length L5 can be between about 2 inches and about 6 inches. The offset (not shown) between the other side edge 118 of the support frame 102 and the observer 108 can also be between about 2 inches and about 6 inches in a direction parallel to the second support arm 106. While the observer 108 is only shown being offset from the side edge 116 of the support frame 102, it should be understood that the observer 108 can be offset from all the edges of the support frame 102 depending on the positioning of the observer 108 caused by rotation of one or more of the components of the observer system about the first and second axes FA, SA. In some embodiments, the observer 108 can be offset relative to some edges of the support frame 102 depending on the positioning of the first and second support member 104, 106, but the support frame 102 may be configured to cover the observer at certain positions for protection from debris or any other damaging environmental elements. For example, the observer 108 may be offset relative to all of the edges except one of the top and bottom edges (not shown) of the front face 120 of the support frame. In some of these embodiments, the support frame 102 may include a projecting cover (not shown-see, e.g., cover 222 of the observer system 200 shown in FIGS. 2-7) that extends from the front face 120 (or any other face of the support frame 102) for further covering the observer 108 to protect the observer from debris or any other damaging environmental elements.

The support frame 102 provides support to the first support member 104, the second support member 106, the observer 108, and any other components of the observer system 100 that are connected to the aforementioned components. The support frame 102 can also include mechanics internal thereto (not shown) for facilitating rotation of one or more of the first support member 104, the second support member 106, the third support member 110, and the observer 108. For example, the support frame 102 may house a motor for facilitating rotation of one or more of these components. In addition, the support frame 102 can include technology internal thereto (not shown) for communicating with and supporting the observer 108.

FIGS. 2-7 illustrate another observer system 200 that includes a support frame 202, a first support member 204, a second support member 206, a third support member 210, and an observer 208. In the illustrated embodiment, the observer 208 includes an optical sensor. The observer 208 can, however, take any suitable form, such as, for example, any other form described in the present application.

The first support member 204 is attached to a front face 220 of the support frame 202 and configured to rotate relative to the support frame 202. In the illustrated embodiment, the first support member 204 is attached to a protruding member 228 that extends from the front face 220 of the support frame 202, and the first support member 204 is configured to rotated about the protruding member 228. The first support member 204 can include mechanics internal thereto (not shown) that allow the first support member to rotate about a first axis FA. In the illustrated embodiment, the first axis is substantially perpendicular to the front face 220 of the support frame 202.

The second support member 206 is attached to the first support member 204 such that the second support member 206 rotates about the first axis FA as the first support member 204 rotates about the first axis FA. In the illustrated embodiment, the second support member 206 is fixedly attached to the first support member 204. A second axis SA extends along a length of the second support member 206 and maintains a position with the second support member 206 such that the second axis SA moves as a result of the second support member 206 moving due to rotation of the first support member 204. The third support member 210 is rotatably attached to the second support member 106 such that the third support member 210 is configured to rotate about the second axis SA, and the observer is fixed to the third support member 210 such that the observer 208 rotates about the second axis SA as the third support member 210 rotates about the second axis SA. In alternative embodiments, the second support member 206 is configured to rotate about the second axis SA, and the third support member 210 is fixedly attached to the second support member 206. In the illustrated embodiment, the second axis SA is substantially perpendicular to the first axis FA. The second axis SA, however, take any other suitable position relative to the first axis FA, provided that the observer 208 is capable of moving relative to the support structure such that the observer 208 can obtain 4 pi steradian access. The first, second and third support members 204, 206, 210 can be made of any suitable material, such as, for example, titanium, carbon fiber, any other suitable material, and any combination thereof.

In some embodiments, the first support member 204, the second support member 206, the third support member 210, and/or the observer 208 are able to rotate both clockwise and counterclockwise 180 degrees from an original position, which allows for 360 degrees of rotation. In alternative embodiments, the first support member 204, the second support member 206, the third support member 210, and/or the observer 208 are able to rotate 360 degrees in only a clockwise direction, 360 degrees in only a counterclockwise direction, or 360 degrees in both a clockwise and counterclockwise direction.

The observer system 200 is configured to allow the observer 208 to obtain 4 pi steradian access. That is, the observer 208 is capable of observing in all directions without the support frame 202 obstructing the field of view of the observer, regardless of the orientation of the support frame 202. In the illustrated embodiment, the observer 208 is configured to rotate about both the first axis FA (e.g., via the rotation of the of the first support member 204) and the second axis SA (e.g., via rotation of the third support member 210). This movement of the observer 208 about both the first and second axes FA, SA allows the observer 208 to observe in all directions. An end 214 of the second support member 206 that is opposite the observer 208 can include weight(s) 224 to mass-balance the observer system 200. For example, the weight(s) 224 can be configured to at least partially offset the mass of the observer 208. The balance caused by the weight(s) 224 can also allow for inertial stability to keep the observer 208 pointing toward a target when the support frame 202 moves relative to the target during observation. The end 214 of the second support member 206 can also include any other electronic components or other types of components that work with the observer 208, such as, for example, any of the electronic or other types of components described in the '264 Patent.

The first support member 204, the second support member 206, and the observer 208 are positioned relative to the support frame 202 such that none of these components contact the support frame to prevent the observer 208 from having 4 pi steradian access. That is, the dimensions of the first support member 204, the second support member 206, and the observer 208, as well as the offset of these components relative to the support frame 202, allow for the observer 208 to move freely to observe in all directions. The dimensions can be scalable to accommodate a wide variety of sizes for the observer system 200. In some embodiments, the first support member 204 can have a length extending along the first axis FA of between about 5 inches and about 10 inches. The second support member 206 can be offset from a front face 220 of the support frame 202 by a length (e.g., similar to length L2 shown in FIG. 1) that is between about 2 inches and about 6 inches, which allows clearance for the second observer 208 and the weight(s) 224 to swing relative to the front face 220. The observer 208 can extend from the first support member 204 by a length extending along the second axis SA that is between about 10 inches and about 12 inches from the first axis FA such that the observer 208 can observe past the edges of the support frame 202. The observer 208 can be offset from a front face 220 of the support frame 202 in a direction parallel to the first support member 204 by a length (e.g., similar to length L4 shown in FIG. 1) that is between about 1 inch and about 3 inches. In other embodiments, the observer 208 can extend past the front face 220 of the support frame 202 such that at least a portion of the observer 208 can be positioned proximate one or more side faces of the support frame 202.

Figure 3:
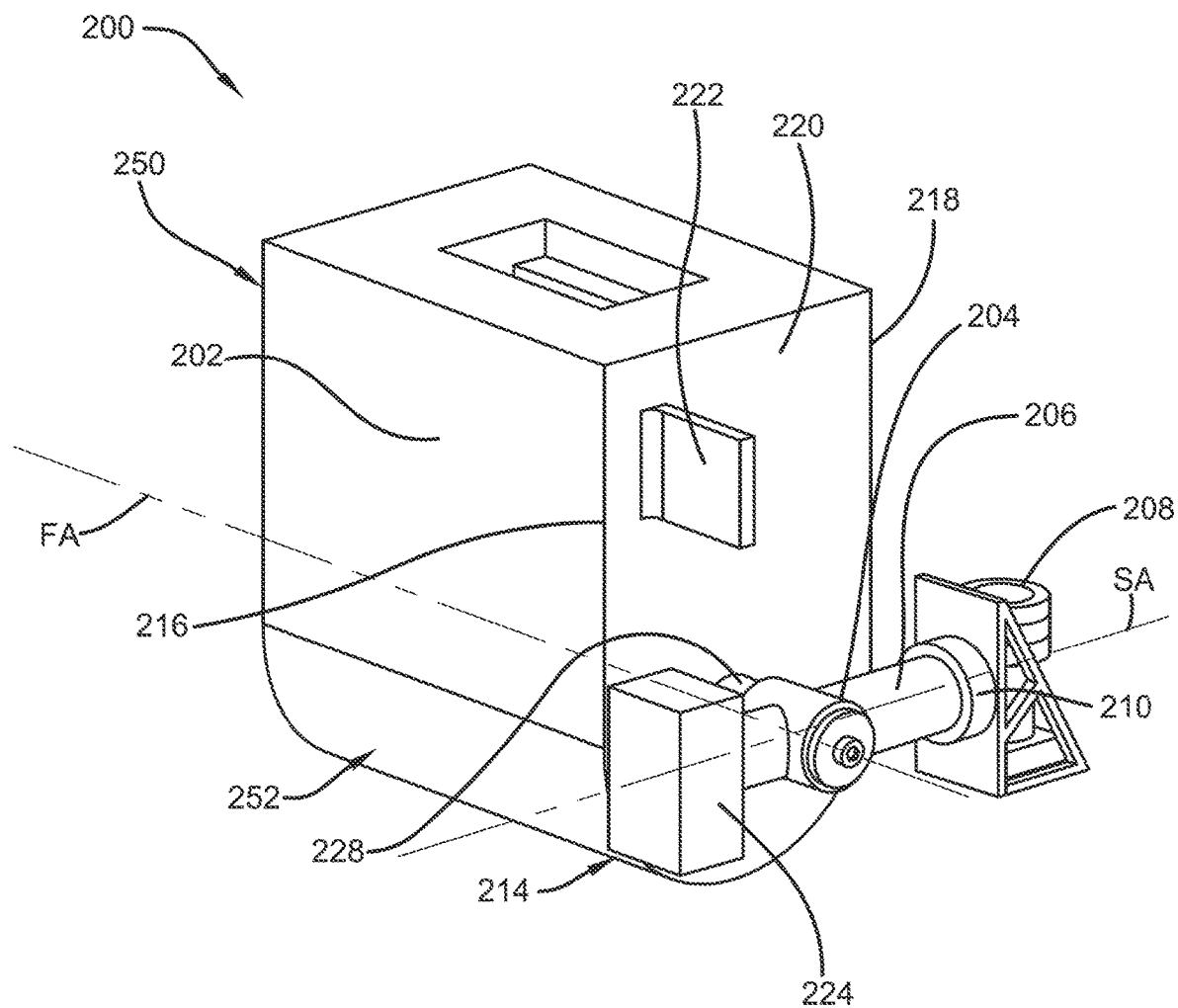
FIG. 3 is a perspective view of the observer system of FIG. 2, where the observer of the observer system is in another position.
Figure 4:
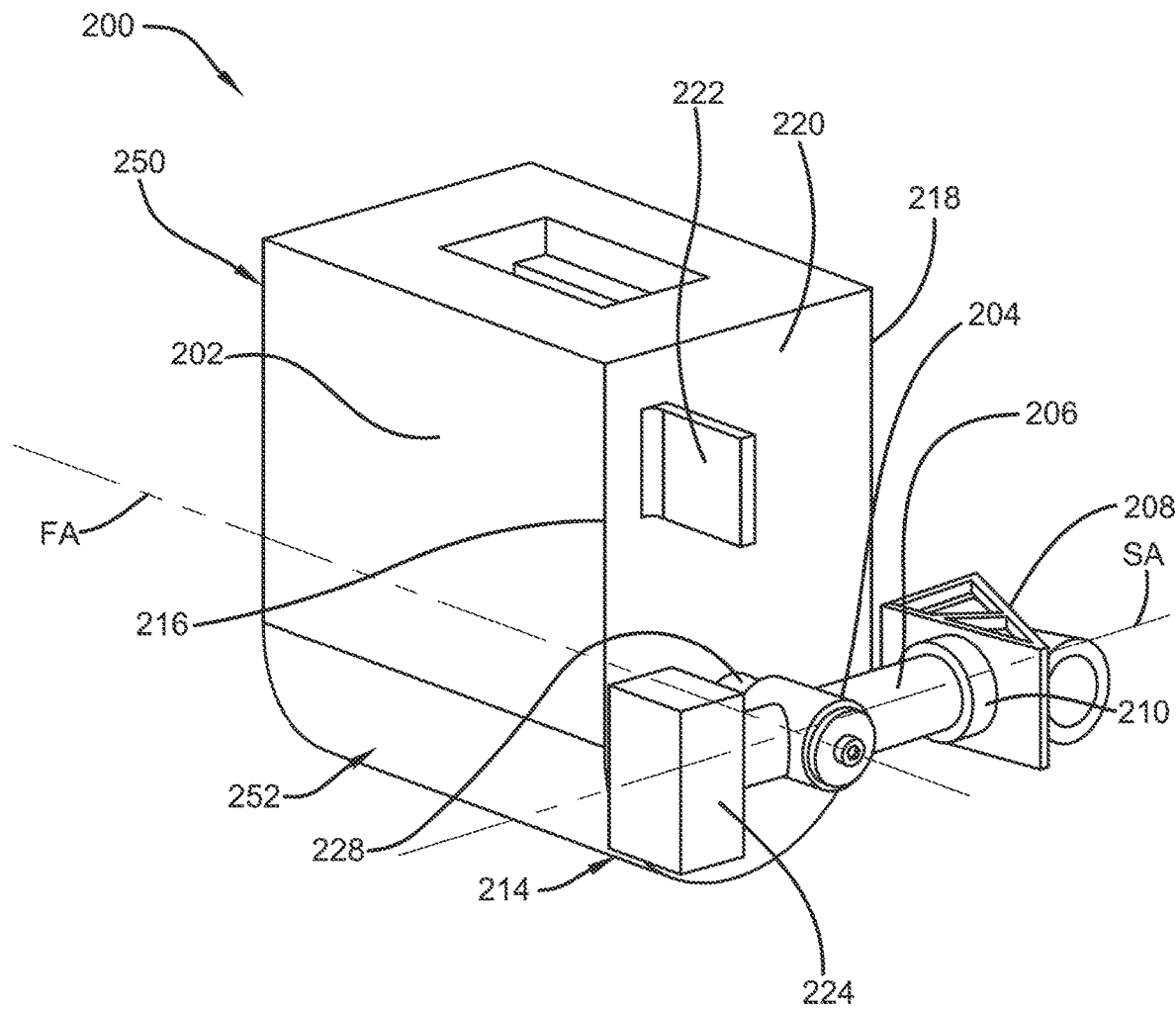
FIG. 4 is a perspective view of the observer system of FIG. 2, where the observer of the observer system is in another position.

Referring to FIGS. 3-4, the observer 208 can be offset from one or more edges of the support frame 202 in a direction parallel to the second support member 206 such that a field of view of the observer 208 (e.g., field of view 170 for the observer 108 shown in FIG. 1) is not obstructed by the support frame 202. For example, the observer 208 can be offset from one or more edges of the support frame 202 by a length (e.g., similar to length L5 shown in FIG. 1) that is between about 2 inches and about 6 inches.

Figure 2:
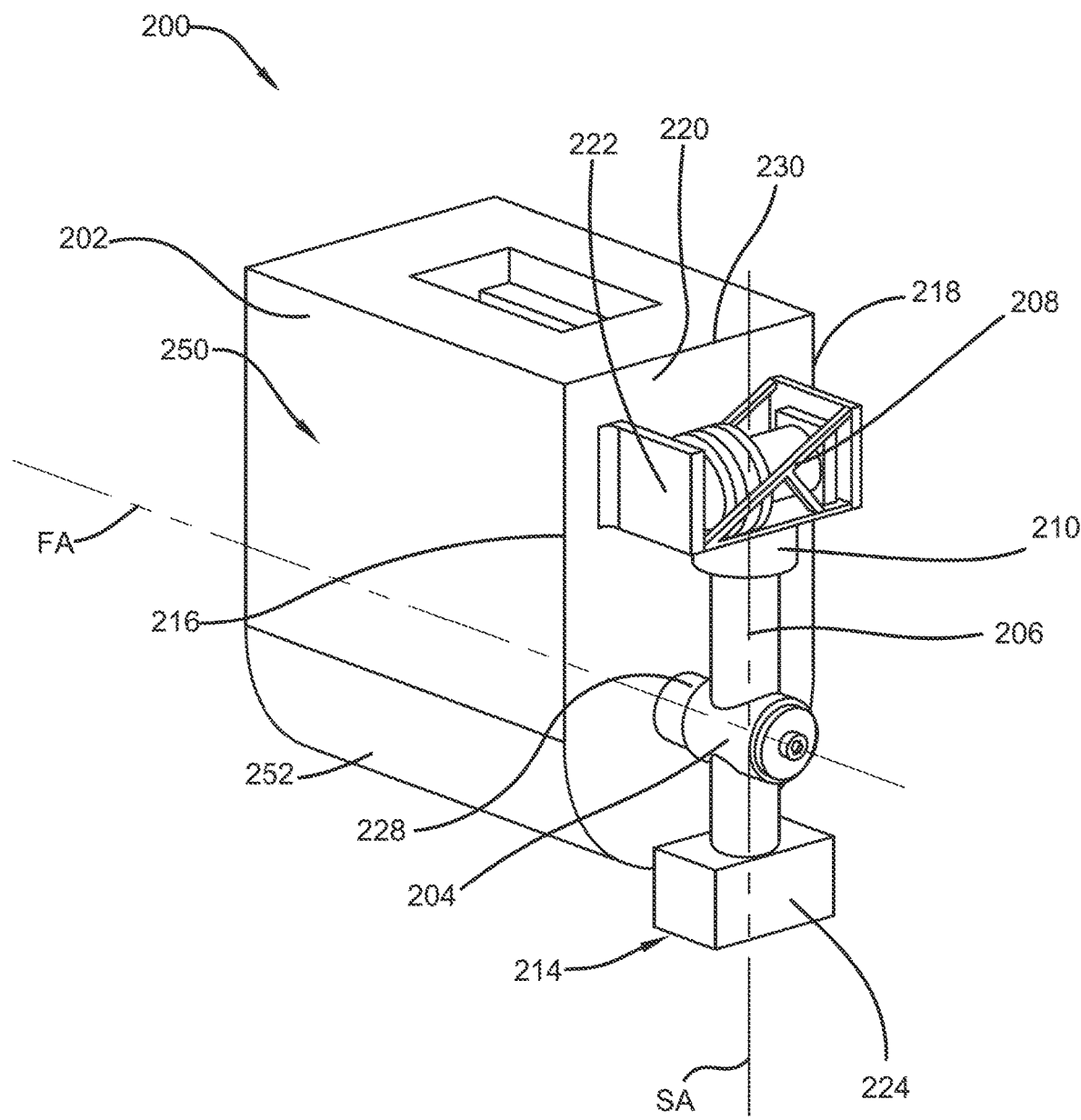
FIG. 2 is a perspective view of another exemplary embodiment of an observer system, where an observer of the observer system is in an original position.

FIGS. 2-7 shows the observer 208 in various positions relative to the support frame 202. FIG. 2 illustrates the observer system 200 with the observer 208 in a first position. In this position, the observer 208 is positioned such that it is covered by a projecting cover 222 that extends from the front face 220 of the support frame 202. The projecting cover 222 prevents debris or any other damaging environmental elements from engaging the observer 208. In the first position, the observer 208 is positioned below the top edge 230 of the support frame 202 and between the side edges 216, 218 such that the support frame 202 provides further protection to the observer 208 from debris and any other damaging environmental elements. In alternative embodiments, the observer 208 may extend beyond the top edge 230 of the support frame 202 when the observer 208 is in the first position. It should also be understood that the projecting cover 222 could be positioned at any other suitable location on the support frame 202 that is capable of protecting the observer 208 from debris and other damaging environmental elements.

Referring to FIG. 3, the observer 208 is moved from the first position to another position in which the observer 208 is positioned beyond the side edge 218 of the support frame 202 and the observer 208 is facing an upward direction. The observer 208 was moved from the position shown in FIG. 2 to the position shown in FIG. 3 by rotating the first support member 204 by 90 degrees in a clockwise direction. The third support member 210 was maintained in its original position, which causes the observer to be facing the upward direction. Referring to FIG. 4, the observer 208 is moved to another position in which the observer 208 remains positioned beyond the side edge 218 of the support frame, but the observer is now facing a forward direction. The observer 208 was moved from the position shown in FIG. 3 to the position shown in FIG. 4 by rotating the third support member 210 by 90 degrees in a clockwise direction, while the first support member 204 was maintained in the position shown in FIG. 3. While FIGS. 3 and 4 show the observer 208 extending beyond the side edge 218 of the support frame 202 and facing the upward and forward directions, respectively, it should be understood that the third support member 210 can be rotated to cause the observer 208 to face any direction along 360 degrees of the second axis SA as the observer is positioned beyond the side edge 218.

Figure 5:
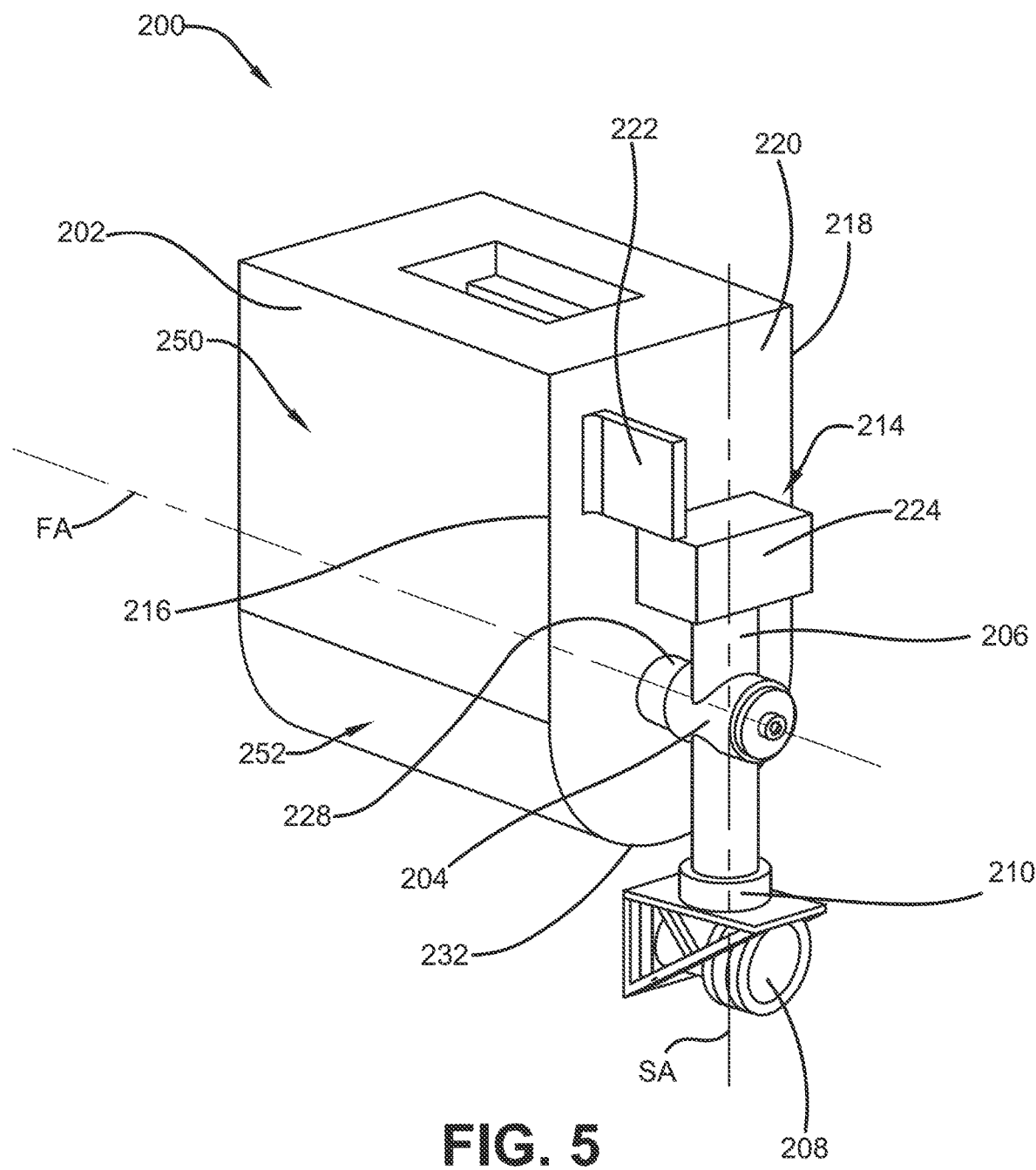
FIG. 5 is a perspective view of the observer system of FIG. 2, where the observer of the observer system is in another position.
Figure 6:
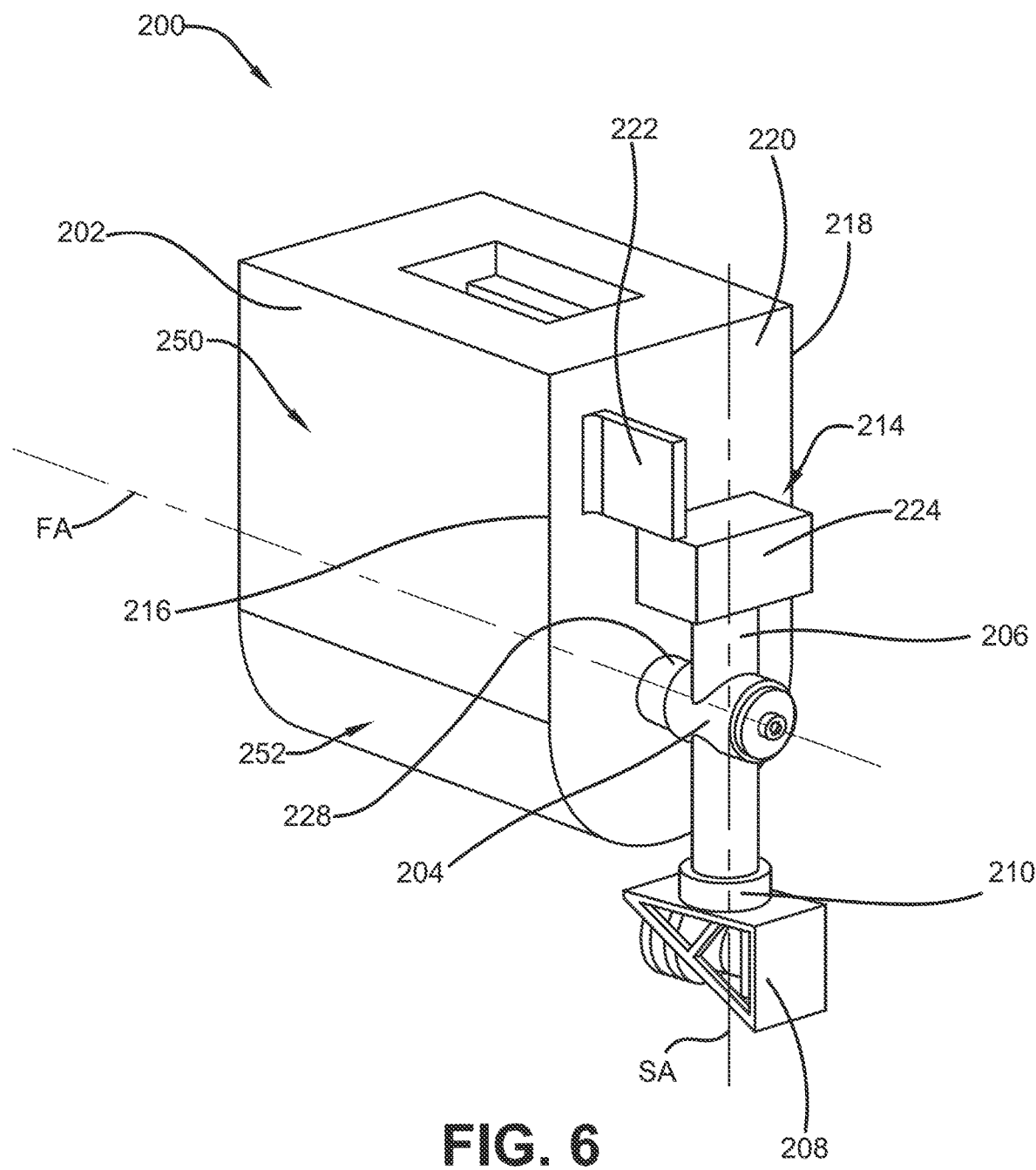
FIG. 6 is a perspective view of the observer system of FIG. 2, where the observer of the observer system is in another position.

Referring to FIG. 5, the observer 208 is moved to another position in which the observer 208 is positioned below a bottom edge 232 of the support frame 202, and the observer 208 is facing a forward direction. The observer 208 was moved from the position shown in FIG. 4 to the position shown in FIG. 5 by further rotating the first support member 204 by 90 degrees in the clockwise direction, while the third support member 210 was maintained in the position shown in FIG. 4. Referring to FIG. 6, the observer 208 is moved to another position in which the observer 208 remains positioned below the bottom edge 232 of the support frame 202, and the observer 208 is now facing a rearward direction. The observer 208 was moved from the position shown in FIG. 5 to the position shown in FIG. 6 by rotating the third support member 210 by 180 degrees in either the clockwise or counterclockwise direction, while the first support member 204 was maintained in the position shown in FIG. 5. While FIGS. 5 and 6 show the observer 208 extending beyond the bottom edge 232 of the support frame 202 and facing the forward and rearward directions, respectively, it should be understood that the third support member 210 can be rotated to cause the observer 208 to face any direction along 360 degrees of the second axis SA as the observer 208 is positioned beyond the bottom edge 232.

Figure 7:
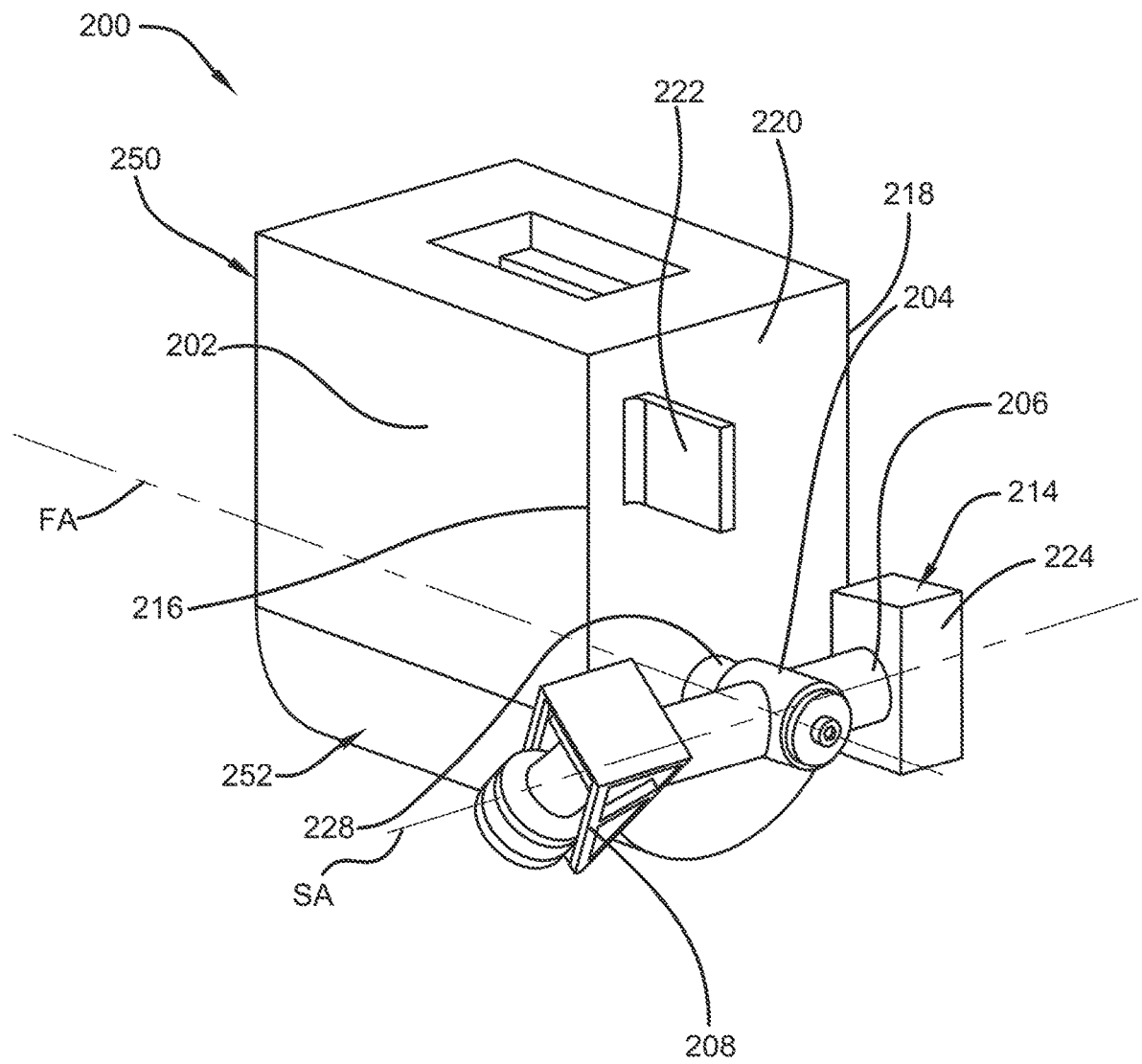
FIG. 7 is a perspective view of the observer system of FIG. 2, where the observer of the observer system is in another position.

Referring to FIG. 7, the observer 208 is moved to another position in which the observer 208 is positioned beyond the side edge 216 of the support frame 202, and the observer 208 is facing a rearward and downward direction. The observer 208 was moved from the position shown in FIG. 6 to the position shown in FIG. 7 by further rotating the first support member 204 by 90 degrees in the clockwise direction, while also rotating the third support member 210 by about 45 degrees in the clockwise direction. It should be understood that the third support member 210 can be rotated to cause the observer 208 to face any direction along 360 degrees of the second axis SA as the observer 208 is positioned beyond the side edge 216 of the support frame 202.

While FIGS. 2-7 illustrate rotation of the first support member 204 by 90 degree increments to show the observer 208 positioned relative to the top edge 230, the bottom edge 232 and the side edges 216, 218 of the support frame 202, it should be understood that the first support member 204 can be rotated to cause the observer to be positioned at any location along 360 degrees of the first axis FA. In an example, rotation of the first support member 204 can occur in either rotary direction plus or minus about 190-200 degrees, thereby providing over 360-degree coverage; in such an example, the first support member 204 is unable to continuously rotate in one direction.

In the illustrated embodiment, the support frame 202 has rectangular prism shaped upper portion 250 and a rounded bottom portion 252. The rounded bottom portion 252 is shaped to allow the observer 208 to have a clear observation range that extends past the support frame 202. The support frame 202 can, however, take any other suitable shape, such as, for example, any shaped described in the present application.

The support frame 202 provides support to the first support member 204, the second support member 206, the third support member 210, and the observer 208, and any other components of the observer system 200 that are connected to the aforementioned components. The support frame 202 can also include mechanics internal thereto (not shown) for facilitating rotation of one or more of the first support member 204, the second support member 206, the third support member 210, and the observer 208. For example, the support frame 202 may house a motor for facilitating rotation of one or more of these components. In addition, the support frame 202 can include technology internal thereto (not shown) for communicating with and supporting the observer 208.

Figure 8:
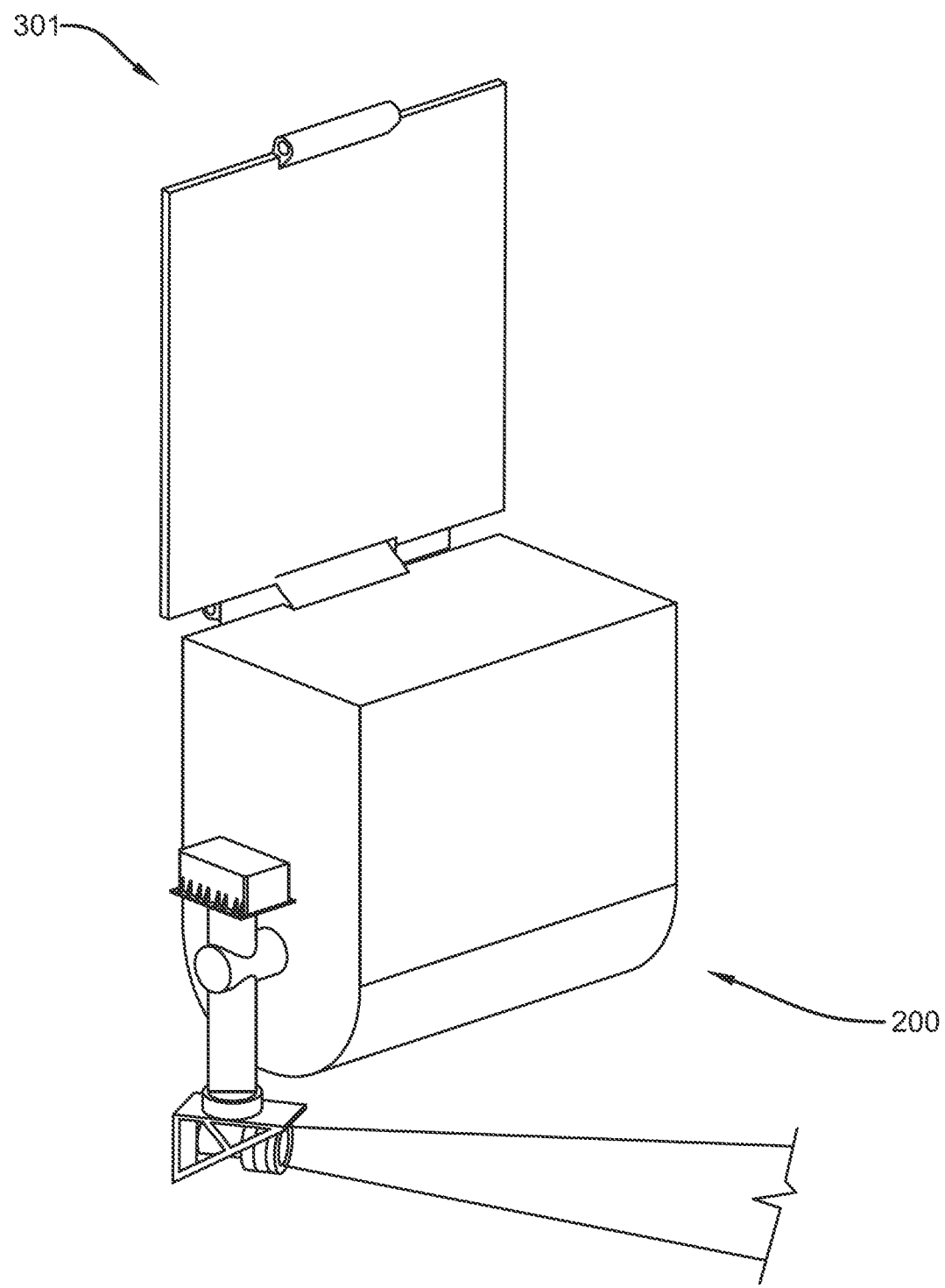
FIG. 8 is a perspective view of an exemplary embodiment of a satellite that includes the observer system of FIGS. 2-7.

FIG. 8 shows an exemplary embodiment of a satellite 301 that includes the observer system 200 shown in FIGS. 2-7. While the satellite 301 is shown as having the observer system 200, it should be understood that any other observer system disclosed in the present application can be used with the satellite 301.

Figure 9:
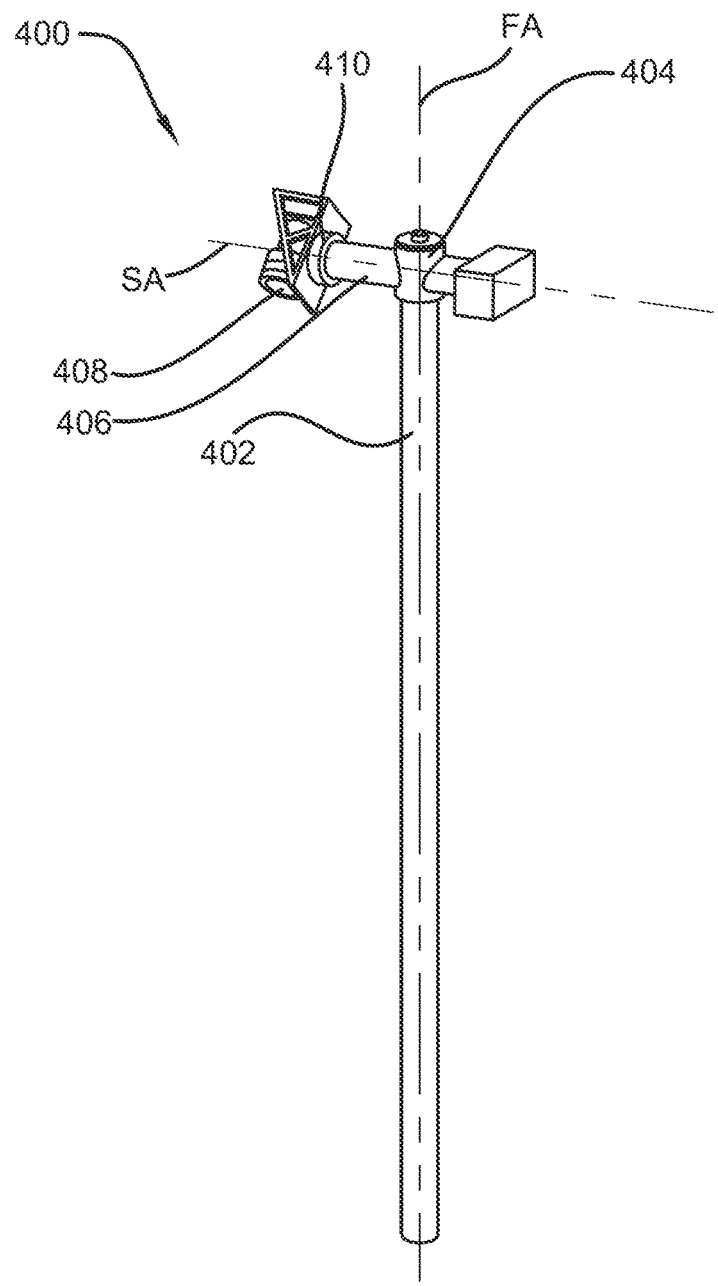
FIG. 9 is a perspective view of another exemplary embodiment of an observer system.

FIG. 9 illustrates another observer system 400 that works similarly to the observer system 200 shown in FIGS. 2-7, except that the support frame 402 for the observer system 400 is different than the support frame 202 for the support frame 200. That is, referring to FIG. 9, the observer system 400 includes a support frame 402, a first support member 404, a second support member 406, a third support member 410, and an observer 408. The observer 408 can take any suitable form, such as, for example, the form of the observer 208 shown in FIGS. 2-7 or any other form described in the present application.

The first support member 404 is attached to the support frame 402 and configured to rotate relative to the support frame 402 along a first axis FA. The first support member 404 can include mechanics internal thereto (not shown) that allow the first support member to rotate about a first axis FA. The second support member 406 is attached to the first support member 404 such that the second support member 406 rotates about the first axis FA as the first support member 404 rotates about the first axis FA. The second support member 406 can be fixedly attached to the first support member 404 such that a second axis SA extends along a length of the second support member 406 and maintains a position with the second support member 406. The third support member 410 is rotatably attached to the second support member 406 such that the third support member 410 is configured to rotate about the second axis SA, and the observer 408 is fixed to the third support member 410 such that the observer 408 rotates about the second axis SA as the third support member 410 rotates about the second axis SA. The first, second and third support members 404, 406, 410 can be made of any suitable material, such as, for example, titanium, carbon fiber, any other suitable material, and any combination thereof.

The observer system 400 is configured to allow the observer 408 to obtain 4 pi steradian access. That is, the observer 408 is capable of observing in all directions without the support frame 402 obstructing the field of view of the observer, regardless of the orientation of the support frame 402. In some embodiments, the first support member 404, the second support member 406, the third support member 410, and/or the observer 408 are able to rotate both clockwise and counterclockwise 180 degrees from an original position, which allows for 360 degrees of rotation. In alternative embodiments, the first support member 404, the second support member 406, the third support member 410, and/or the observer 408 are able to rotate 360 degrees in only a clockwise direction, 360 degrees in only a counterclockwise direction, or 360 degrees in both a clockwise and counterclockwise direction.

In the illustrated embodiment, the support frame 402 includes a pole having a length that extends along the first axis FA. The support frame 402 can, however, take any other suitable shape, such as, for example, any shaped described in the present application.

The support frame 402 provides support to the first support member 404, the second support member 406, the third support member 410, and the observer 408, and any other components of the observer system 400 that are connected to the aforementioned components. The support frame 402 can also include mechanics internal thereto (not shown) for facilitating rotation of one or more of the first support member 404, the second support member 406, the third support member 410, and the observer 408. For example, the support frame 402 may house a motor for facilitating rotation of one or more of these components. In addition, the support frame 402 can include technology internal thereto (not shown) for communicating with and supporting the observer 408.

Figure 10:
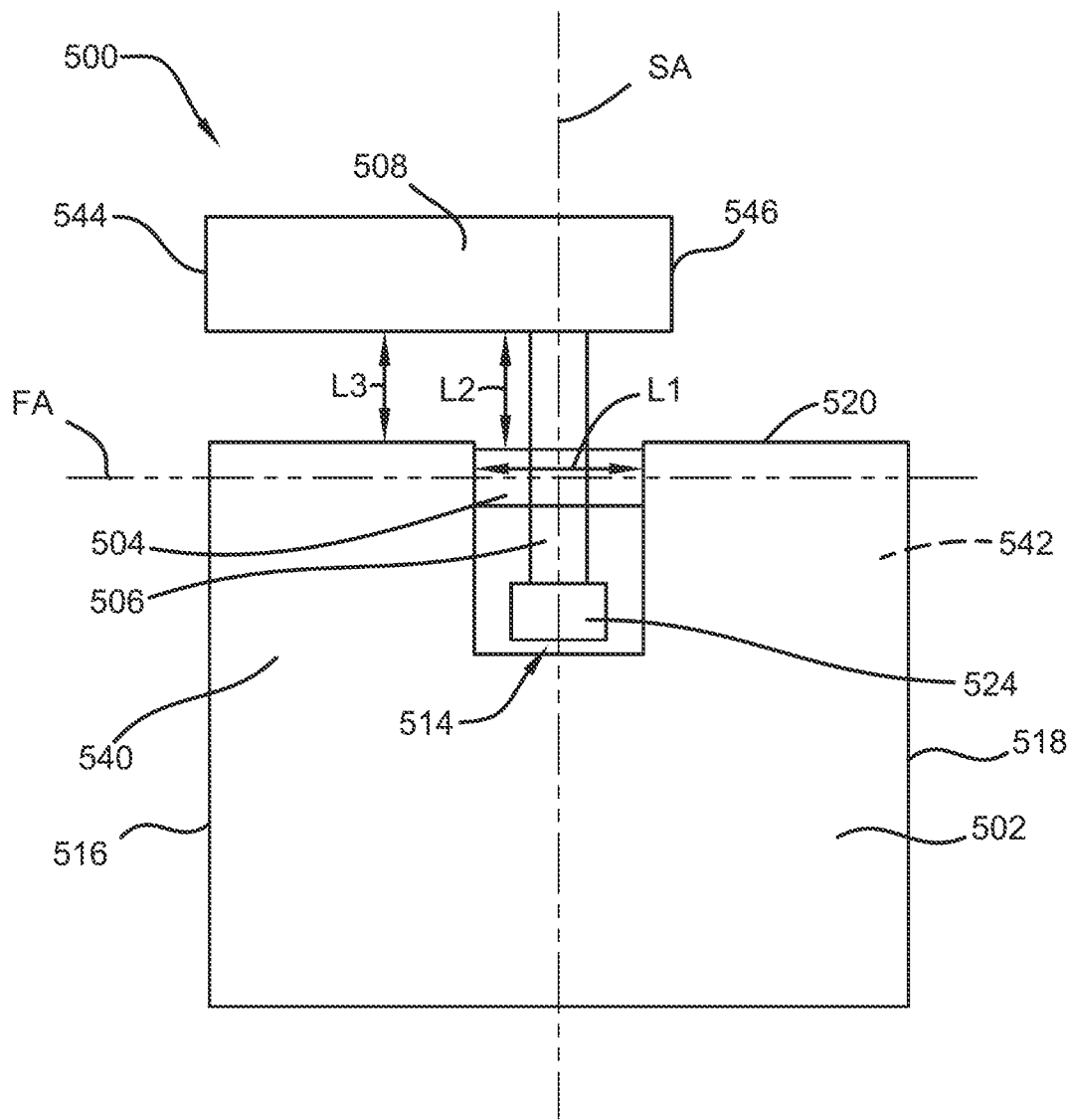
FIG. 10 is a perspective view of another exemplary embodiment of an observer system.

Referring to FIG. 10, another exemplary embodiment of an observer system 500 includes a support frame 502, a first support member 504, a second support member 506, and an observer 508. The observer 508 can be, for example, a sensor, a camera, an antenna, or any other component that is capable of perceiving a physical attribute. In some embodiments, the observer 508 can take the form of a telescope, such as, for example, any telescope described in U.S. Pat. No. 9,244,264 ("the '264 Patent"), which is incorporated herein by reference in its entirety. The observer system 500 can also include any of the components (e.g., electronics, mechanics, etc.) described in the '264 Patent that are used with the telescopes described therein.

The first support member 504 is attached to the support frame 502 and configured to rotate relative to the support frame 502. The first support member 504 can include mechanics internal thereto (not shown) that allow the first support member to rotate about a first axis FA. In the illustrated embodiment, the first axis FA is substantially parallel to a front face 520 of the support frame 502.

The second support member 506 is attached to the first support member 504 such that the second support member 506 rotates about the first axis FA as the first support member 504 rotates about the first axis FA. The second support member 506 can be fixedly attached to the first support member 504, or the second support member 506 can be rotatably attached to the first support member 504 such that the second support member 506 is able to rotate about a second axis SA, where the second axis SA extends along a length of the second support member 506 and, thus, the second axis SA moves as the second support member 506 moves due to rotation of the first support member 504. In embodiments in which the second support member 506 is rotatably attached to the first support member 504, the second support member 506 can include mechanics internal thereto (not shown) that allow the second support member to rotate about the second axis SA. In the illustrated embodiment, the second axis SA is substantially perpendicular to the first axis FA. The second axis SA, however, takes any other suitable position relative to the first axis FA, provided that the observer 508 is capable of moving relative to the support structure such that the observer 508 can obtain 4 pi steradian access. The first and second support members 504, 506 can be made of any suitable material, such as, for example, titanium, carbon fiber, any other suitable material, and any combination thereof.

In some embodiments, the observer system 500 includes a third support member (not shown—e.g., similar to the third support member 110 shown in FIG. 1 and the third support member 210 shown in FIGS. 2-7) that is rotatably attached to the second support member 506 and fixed to the observer 508, where the third support member is configured to rotate about the second axis SA and cause the observer 508 to rotate about the second axis SA. In alternative embodiments, the observer 508 may be directly rotatably attached to the second support member 506 such that the observer 508 can rotate about the second axis SA.

In some embodiments, the first support member 504, the second support member 506, the third support member (not shown), and/or the observer 508 are able to rotate both clockwise and counterclockwise a sufficient number of degrees from an original position (e.g., approximately +/−170 degrees), which allows for 4 pi steradian field of regard. In alternative embodiments, the first support member 504, the second support member 506, the third support member, and/or the observer 508 are able to rotate in only a clockwise direction, only a counterclockwise direction, or in both a clockwise and counterclockwise direction a sufficient number of degrees to support a 4 pi steradian field of regard.

The observer system 500 is configured to allow the observer 508 to obtain 4 pi steradian access. That is, the observer 508 is capable of observing in all directions without the support frame 502 obstructing the field of view of the observer, regardless of the orientation of the support frame 502. In the illustrated embodiment, the observer 508 is configured to rotate about both the first axis FA (e.g., via the rotation of the of the first support member 504) and the second axis SA (e.g., via rotation of at least one of the second support member 506, a third support member (not shown), or the observer 508 itself). This movement of the observer 508 about both the first and second axes FA, SA allows the observer 508 to observe in all directions. In some embodiments, an end 514 of the second support member 506 that is opposite the observer 508 can include weight(s) 524 to mass-balance the observer system 500. For example, the weight(s) 524 can be configured to at least partially offset the mass of the observer 508. The balance caused by the weight(s) 524 can also allow for inertial stability to keep the observer 508 pointing toward a target when the support frame 502 moves relative to the target during observation, as described in the '264 patent. The end 514 of the second support member 506 can also include any other electronic components or other types of components that work with the observer 508.

The first support member 504, the second support member 506, and the observer 508 are positioned relative to the support frame 502 such that none of these components contact the support frame to prevent the observer 508 from having 4 pi steradian access. That is, the dimensions of the first support member 504, the second support member 506, and the observer 508, as well as the offset of these components relative to the support frame 502, allow for the observer 508 to move freely to observe in all directions. The dimensions can be scalable to accommodate a wide variety of sizes for the observer system 500. In some embodiments, the first support member 504 can have a length L1 of between about 6 inches and about 30 inches. The observer 508 can extend from the first support member 504 by a length L2 that is between about 1 inch and about 5 inches. The length L2 can allow the observer 508 to have sufficient clearance relative to the front face 520 such that the observer can be rotated 360 degrees about the second axis SA. The observer 508 can be offset from a front face 520 of the support frame 502 by a length L3 that is between about 1 inch and about 5 inches when the first support member 504 is at a perpendicular position relative to the front face 520. The lengths L2, L3 can be configured to prevent a rear edge 546 of the observer 508 does not contact the support frame 502 when the observer 508 is rotated relative to the support frame 502.

In certain embodiments, the second support member 506 and observer 508 are configured such that the observer 508 extends beyond side faces 540, 542 of the support frame 502 (i.e., the faces that are into and out of the page for the drawing shown in FIG. 10) when the first support member 504 is rotated to a position in which the second support member 506 is substantially perpendicular to the corresponding side face 540, 542. For example, the observer 508 can extend from the side faces 540, 542 of the support frame 502 by between about 10 inches and about 30 inches when the second support member 506 is in a substantially perpendicular position relative to the corresponding side face 540, 542.

The front face 544 of the observer 508 can be substantially aligned with the edges 516, 518 of the support frame 502 when the second support member 506 is substantially perpendicular to the front face 520 of the support frame and the observer 508 is substantially parallel to the front face 520 of the support frame. In other embodiments, the front face 544 of the observer 508 can extend beyond the edges 516, 518 of the support frame when in the aforementioned position, or the edges 516, 518 can extend beyond the front face 544 of the observer 508.

In some embodiments, the support frame 502 may include a projecting cover (not shown-see, e.g., cover 222 of the observer system 200 shown in FIGS. 2-7) that extends from the support frame 502 for providing protection to the front face 544 of the observer 508 from debris or any other damaging environmental elements.

The support frame 502 provides support to the first support member 504, the second support member 506, the observer 508, and any other components of the observer system 500 that are connected to the aforementioned components. The support frame 502 can also include mechanics internal thereto (not shown) for facilitating rotation of one or more of the first support member 504, the second support member 506, a third support member (not shown), and the observer 508. For example, the support frame 502 may house a motor for facilitating rotation of one or more of these components. In addition, the support frame 502 can include technology internal thereto (not shown) for communicating with and supporting the observer 508.

Figure 11:
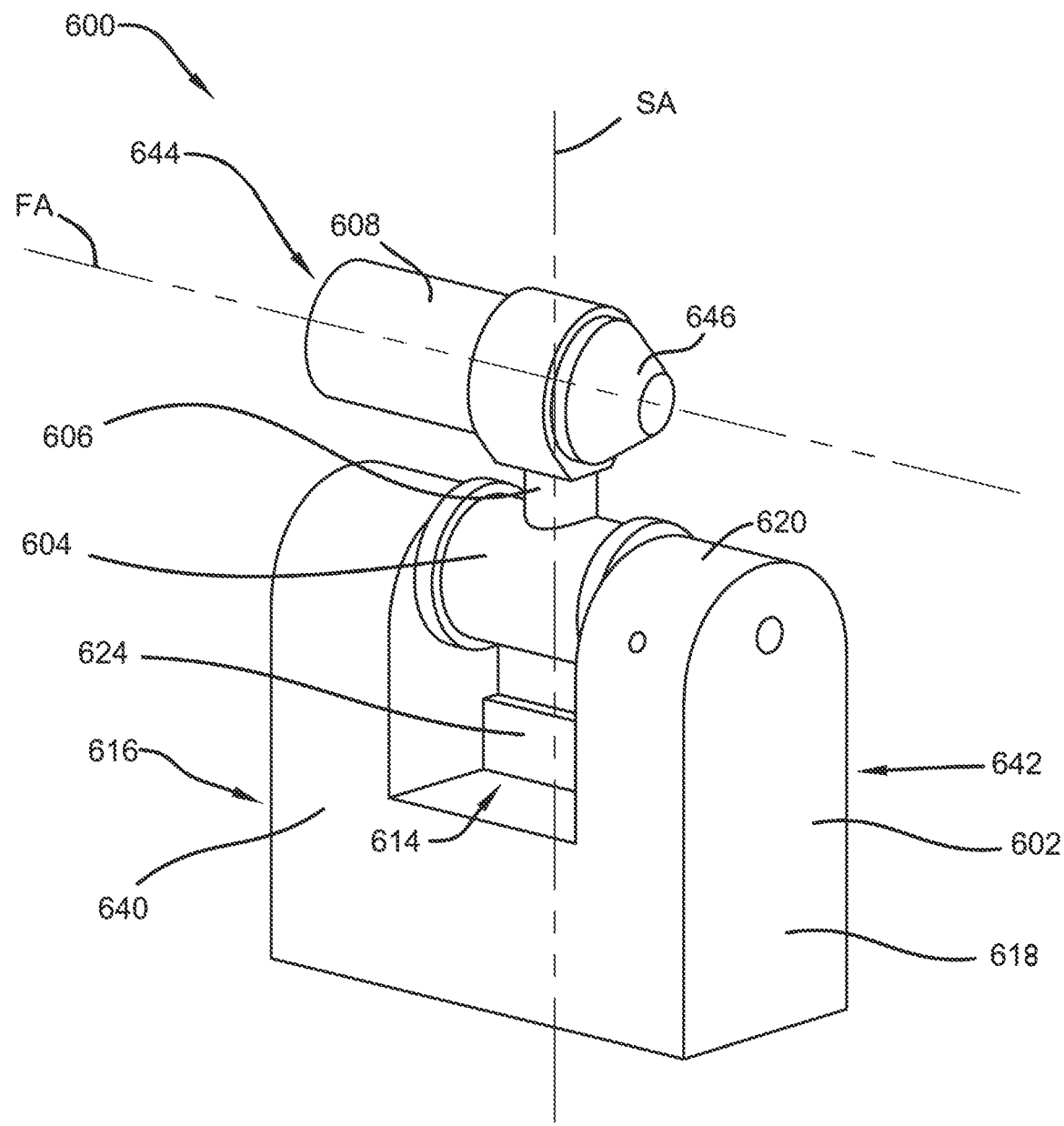
FIG. 11 is a perspective view of another exemplary embodiment of an observer system.

FIG. 11 illustrates another observer system 600 that includes a support frame 602, a first support member 604, a second support member 606, and an observer 608. The observer 608 can take any suitable form, such as, for example, any other form described in the present application. In the illustrated embodiment, the observer 608 includes an agnostic sensor. In certain embodiments, the observer 608 takes the form of the telescope described in the '264 Patent, which is incorporated herein by reference in its entirety. The observer system 600 can also include any of the components (e.g., electronics, mechanics, etc.) described in the '264 Patent that are used with the telescopes described therein. The observer 608 can, however, take any other suitable form, such as, for example, any form described in the present application.

The first support member 604 is attached to the support frame 602 and configured to rotate relative to the support frame 602. The first support member 604 can include mechanics internal thereto (not shown) that allow the first support member to rotate about a first axis FA. In the illustrated embodiment, the first axis FA is substantially parallel to a front face 620 of the support frame 602.

The second support member 606 is attached to the first support member 604 such that the second support member 606 rotates about the first axis FA as the first support member 604 rotates about the first axis FA. In the illustrated embodiment, the second support member 606 is rotatably attached to the first support member 604 such that the second support member 606 can rotate about a second axis SA. The second axis SA extends along a length of the second support member 606 and maintains a position with the second support member 606 such that the second axis SA moves as a result of the second support member 606 moving due to rotation of the first support member 604. The second support member 606 can include mechanics internal thereto (not shown) that allow the second support member to rotate about the second axis SA. In the illustrated embodiment, the second axis SA is substantially perpendicular to the first axis FA. The second axis SA, however, take any other suitable position relative to the first axis FA, provided that the observer 608 is capable of moving relative to the support structure such that the observer 608 can obtain 4 pi steradian access. The first and second support members 604, 606 can be made of any suitable material, such as, for example, titanium, carbon fiber, any other suitable material, and any combination thereof.

In alternative embodiments, the second support member 606 can be fixedly attached to the first support member 604, and a third support member (not shown) can be rotatably attached to the second support member 606 such that the third support member (not shown) is configured to rotate about the second axis SA. In these embodiments, the observer 608 is fixed to the third support member such that the observer 608 rotates about the second axis SA as the third support member rotates about the second axis SA. In other embodiments, the second support member 606 can be fixedly attached to the first support member 604, and the observer 608 can be directly rotatably attached to the second support member 606 such that the observer 608 is configured to rotate about the second axis SA.

The first support member 604, the second support member 606, the third support member, and/or the observer 608 can be configured to rotate both clockwise and counterclockwise 180 degrees from an original position, which allows for 360 degrees of rotation. In alternative embodiments, the first support member 604, the second support member 606, the third support member, and/or the observer 608 can be configured to rotate 360 degrees in a only a clockwise direction, 360 degrees in only a counterclockwise direction, or 360 degrees in both a clockwise and counterclockwise direction.

The observer system 600 is configured to allow the observer 608 to obtain 4 pi steradian access. That is, the observer 608 is capable of observing in all directions without the support frame 602 obstructing the field of view of the observer, regardless of the orientation of the support frame 602. In the illustrated embodiment, the observer 608 is configured to rotate about both the first axis FA (e.g., via the rotation of the of the first support member 604) and the second axis SA (e.g., via rotation of the second support member 606). This movement of the observer 608 about both the first and second axes FA, SA allows the observer 608 to observe in all directions. An end 614 of the second support member 606 that is opposite the observer 608 can include weight(s) 624 to mass-balance the observer system 600. For example, the weight(s) 624 can be configured to at least partially offset the mass of the observer 608. The balance caused by the weight(s) 624 can also allow for inertial stability to keep the observer 608 pointing toward a target when the support frame 602 moves relative to the target during observation. The end 614 of the second support member 606 can also include any other electronic components or other types of components that work with the observer 608, such as, for example, any of the electronic or other types of components described in the '264 Patent.

The first support member 604, the second support member 606, and the observer 608 are positioned relative to the support frame 602 such that none of these components contact the support frame to prevent the observer 608 from having 4 pi steradian access. That is, the dimensions of the first support member 604, the second support member 606, and the observer 608, as well as the offset of these components relative to the support frame 602, allow for the observer 608 to move freely to observe in all directions. The dimensions can be scalable to accommodate a wide variety of sizes for the observer system 600. In some embodiments, the first support member 604 can have a length extending along the first axis of between about 6 inches and about 30 inches. The observer 608 can extend from the first support member 604 by a length extending along the second axis SA that is between about 1 inch and about 5 inches. The observer 608 can be offset from a front face 620 of the support frame 602 by a length that is between about 1 inch and about 5 inches such that the observer 608 has sufficient clearance relative to the front face 620 that allows the observer to be rotated 360 degrees about the second axis SA. The aforementioned dimensions can be selected to prevent a rear edge 646 of the observer 608 does not contact the support frame 602 when the observer 608 is rotated relative to the support frame 602.

The second support member 606 and observer 608 can be configured such that the observer 608 extends beyond side faces 640, 642 of the support frame 602 when the first support member 604 is rotated to a position in which the second support member 606 is substantially perpendicular to the corresponding side face 640, 642. For example, the observer 608 can extend from the side faces 640, 642 of the support frame 602 by between about 10 inches and about 30 inches when the second support member 606 is in a substantially perpendicular position relative to the corresponding side face 640, 642.

The front face 644 of the observer 608 can be substantially aligned with the edges 616, 618 of the support frame 602 when the second support member 606 is substantially perpendicular to the front face 620 of the support frame 602 and the observer 608 is substantially parallel to the front face 620 of the support frame 602. In other embodiments, the front face 644 of the observer 608 can extend beyond the edges 616, 618 of the support frame when in the aforementioned position, or the edges 616, 618 can extend beyond the front face 644 of the observer 608.

In the illustrated embodiment, the support frame 602 has rectangular prism shaped portion and a rounded portion, where the front face 620 of the support frame 602 is curved. The rounded portion is shaped to allow the observer 608 to move around the support frame 602 due to rotation of the first support member 604 such that the observer 608 maintains an offset position relative to the support frame 602. The support frame 602 can, however, take any other suitable shape, such as, for example, any shaped described in the present application.

The support frame 602 provides support to the first support member 604, the second support member 606, the observer 608, and any other components of the observer system 600 that are connected to the aforementioned components. The support frame 602 can also include mechanics internal thereto (not shown) for facilitating rotation of one or more of the first support member 604, the second support member 606, and the observer 608. For example, the support frame 602 may house a motor for facilitating rotation of one or more of these components. In addition, the support frame 602 can include technology internal thereto (not shown) for communicating with and supporting the observer 508.

Figure 13:
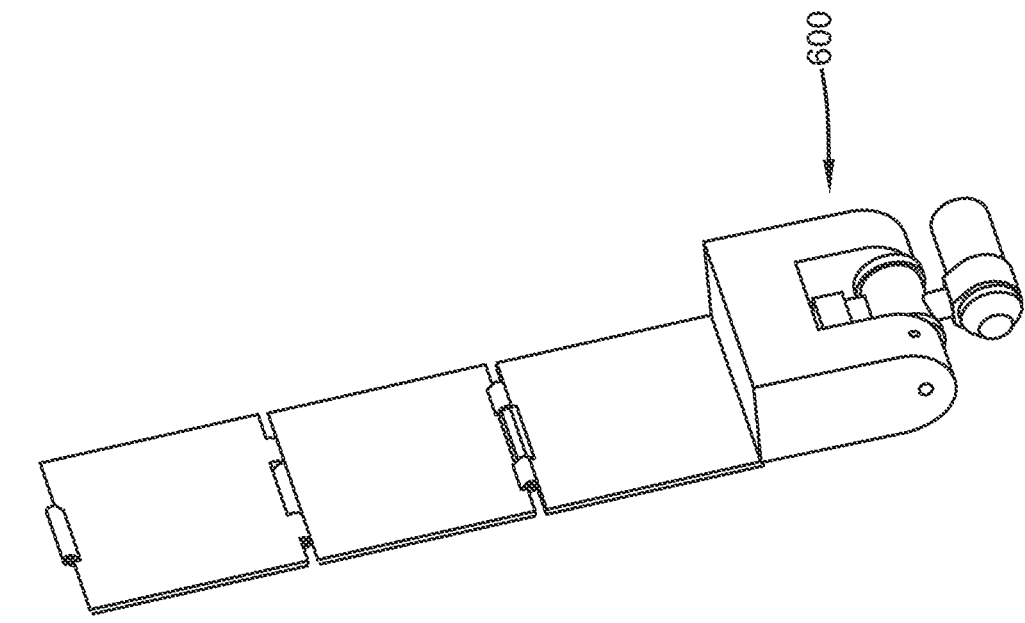
FIG. 13 is a perspective view of the satellite of FIG. 12, where the satellite is in a deployed configuration.
Figure 12:
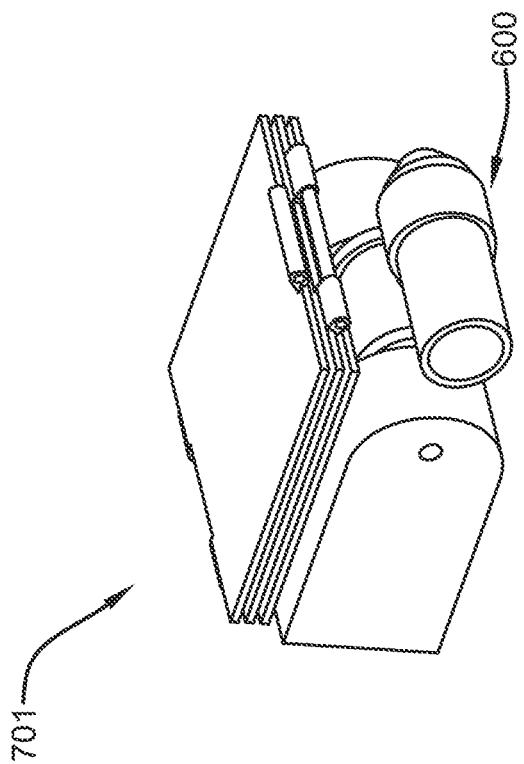
FIG. 12 is a perspective view of another exemplary embodiment of a satellite that includes the observer system of FIG. 11, where the satellite is in a launch configuration.

FIGS. 12-13 shows an exemplary embodiment of a satellite 701 that includes the observer system 600 shown in FIG. 11. While the satellite 701 is shown as having the observer system 600, it should be understood that any other observer system disclosed in the present application can be used with the satellite 701.

Figure 16:
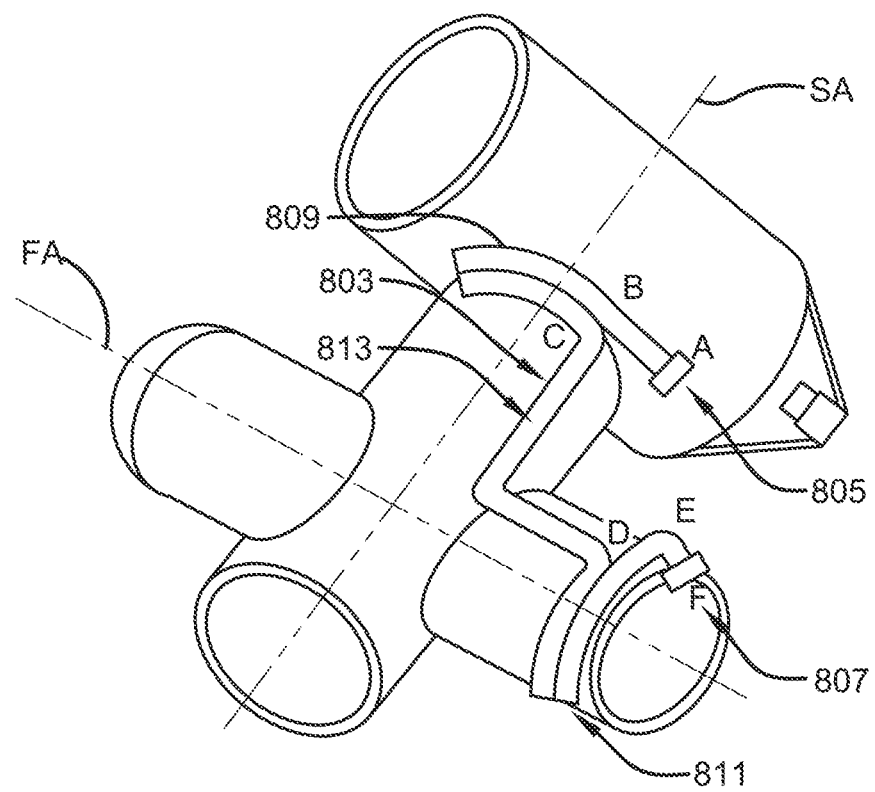
FIG. 16 illustrates the rotary fiber optic cable of FIGS. 14 and 15 being used with an exemplary embodiment of an observer system.

Referring to FIGS. 14-16, an exemplary embodiment of a rotary fiber optic cable 803 is shown that can be used as an internal data transmission component for an observer system, such as, for example, any of the observer systems described in the present application. The rotary fiber optic cable 803 can allow for efficient data transmission across rotary joints (e.g., joints that allow for rotation about an axis). The fiber optic cable 803 includes a first connector 805, a second connector 807, a first rounded portion 809, a second rounded portion 811, and a middle portion 813 between the rounded portions. The first connector 805 and second connector 807 are used to connect devices together for data transmission. For example, the first connector 805 can be connected to an observer (e.g., any of the observers described in the present application), and the second connector 807 can be connected to the internal circuitry of an observer system (e.g., any observer system described in the present application) such that data from the observer can be transmitted from the observer system to a user. The fiber optic cable 803 can include at least one fiber and, in many instances, several fibers side by side in a ribbon cable format to allow duplicate or redundant optical paths.

The first and second rounded portions 809, 811 are configured to be folded back upon themselves. For example, the first rounded portion 809 is folded such that point B is substantially aligned with point C, and the connector 805 at point A extends outward from point B. Similarly, the second rounded portion 811 is folded such that point E is substantially aligned with point D, and the connector 807 at point F extends outward from point E. Referring to FIGS. 15-16, the folded first rounded portion 809 extends around and is concentric with a first axis FA, and the second folded portion 811 extends around and is concentric with a second axis SA. This configuration allows point B of the first rounded portion 809 to move relative to point C and allows point E of the second rounded portion 811 to move relative to point D, which allows for 180 degrees of movement in each direction (or 360 degrees total) about each axis FA, SA.

The rotary fiber optic cable 803 can be used with any observer system described herein. Referring to FIG. 16, in certain embodiments, the observer system can take the form of the observer system 600 shown in FIG. 11. That is, the observer system can include a support frame (not shown), a first support member 604 that is rotatable about a first axis FA, a second support member 606 that is rotatable about a second axis SA, and an observer 608 that is attached to the second support member 606. The first connector 805 at point A can be connected to the observer 608, and the second connector 807 at point F can be connected to internal circuitry disposed within the first support member 604 or the support frame. The middle portion 813 of the rotary fiber optic cable 803 can be configured to bend such that it can extend along the first and second support members 604, 606. While the rotary fiber optic cable 803 is shown being used with the observer system 600, it should be understood that the rotary fiber optic cable 803 can be used with any suitable observer system, such as, for example, any observer system described in the present application. It should be further understood that the rotary fiber optic cable can be used with any other type of systems (other than observer systems) that include cabling across a gimbal, such as systems that include RF transmitters.

While the illustrated rotary fiber optic cable 803 is shown as having two rounded portions 809, 811, it should be understood that, in other instances, the rotary fiber optic cable can include any suitable number of rounded portions that are capable of moving relative to axes while allowing for efficient data transmission. For example, the rotary fiber optic cable 803 can include one rounded portion or three or more rounded portions.

While various inventive aspects, concepts and features of the inventions may be described and illustrated herein as embodied in combination with exemplary embodiments, these various aspects, concepts and features may be used in many alternative embodiments, either individually or in various combinations and sub-combinations thereof. Unless expressly excluded herein, all such combinations and sub-combinations are intended to be within the scope of the present inventions. Still further, while various alternative embodiments as to the various aspects, concepts and features of the inventions—such as alternative materials, structures, configurations, methods, devices and components, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein.

Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure; however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention. Descriptions of exemplary methods or processes are not limited to inclusion of all steps as being required in all cases, nor is the order that the steps are presented to be construed as required or necessary unless expressly so stated.

The invention claimed is:

1. An observer system, comprising:
    a support frame;
    a first support member attached to a first face of the support frame, wherein the first support member is rotatable about a first axis that is substantially perpendicular to the first face;
    a second support member attached to the first support member, wherein the second support member extends along a second axis; and
    an observer attached to the second support member such that the observer is able to rotate about the second axis and substantially parallel to the first axis;
    wherein the observer is rotatable relative to the support frame about both the first axis and the second axis such that the observer has a 4 pi steradian field of regard.

2. The observer system according to claim 1, further comprising a third support member that is rotatable attached to the second support member and fixed to the observer, wherein the third support member allows the observer to rotate about the second axis.

3. The observer system according to claim 1, wherein the first axis is perpendicular to the second axis.

4. The observer system according to claim 1, wherein the observer is offset from the first face of the support frame such that the observer does not contact the support frame as the observer rotates about the first axis and the second axis.

5. The observer system according to claim 1, wherein the observer has a 4 pi steradian field of regard when the support frame is in any arbitrary position.

6. The observer system according to claim 1, wherein the observer comprises an optical sensor.

7. The observer system according to claim 1, wherein the first face of the support frame comprises an upper rectangular shaped portion and a bottom rounded portion.

8. The observer system according to claim 1, further comprising a rotary fiber optic cable that is attached to the observer for transmitting data from the observer, wherein the rotary fiber optic cable has a first rounded portion that is concentric with the first axis when in a folded configuration and a second rounded portion that is concentric with the second axis when in a folded configuration.

* * * * *